(12) United States Patent
Seitz

(10) Patent No.: US 7,256,369 B2
(45) Date of Patent: Aug. 14, 2007

(54) COMPOSITE WIRES FOR COATING SUBSTRATES AND METHODS OF USE

(76) Inventor: Michael Seitz, 7442 Tall Pines Dr., Houston, TX (US) 77088

( * ) Notice: Subject to any disclaimer, the term of this patent is extended or adjusted under 35 U.S.C. 154(b) by 204 days.

(21) Appl. No.: 10/854,826

(22) Filed: May 27, 2004

(65) Prior Publication Data

US 2004/0247946 A1     Dec. 9, 2004

Related U.S. Application Data

(60) Provisional application No. 60/476,875, filed on Jun. 6, 2003.

(51) Int. Cl.
*B23K 35/22* (2006.01)
(52) U.S. Cl. .............................. 219/146.51; 219/145.22
(58) Field of Classification Search ........... 219/146.51, 219/145.22, 76.1, 76.14
See application file for complete search history.

(56) References Cited

U.S. PATENT DOCUMENTS

| | | | | |
|---|---|---|---|---|
| 3,603,763 | A * | 9/1971 | Juzvenko et al. | 219/146.51 |
| 3,855,447 | A * | 12/1974 | Kilp | 219/146.51 |
| 4,578,114 | A * | 3/1986 | Rangaswamy et al. | 75/252 |
| 4,741,974 | A | 5/1988 | Longo et al. | |
| 5,250,355 | A * | 10/1993 | Newman et al. | 428/367 |
| 5,294,462 | A | 3/1994 | Kaiser et al. | |
| 5,332,628 | A | 7/1994 | Drossman | |
| 5,837,326 | A | 11/1998 | Dallaire et al. | |
| 5,976,704 | A | 11/1999 | McCune | |
| 6,156,443 | A | 12/2000 | Dallaire et al. | |
| 6,258,416 | B1 | 7/2001 | Seitz | |
| 6,513,728 | B1 | 2/2003 | Hughes et al. | |
| 6,603,090 | B1 | 8/2003 | Schreiber et al. | |
| 2004/0001966 | A1 | 1/2004 | Subramanian et al. | |

FOREIGN PATENT DOCUMENTS

| | | |
|---|---|---|
| EP | 0522438 | 1/1993 |
| GB | 699 646 * | 11/1953 |
| WO | WO9800574 | 1/1998 |
| WO | WO 0108810 | 2/2001 |

* cited by examiner

*Primary Examiner*—Kevin P. Kerns
(74) *Attorney, Agent, or Firm*—John R Casperson; Harish Dhingra

(57) ABSTRACT

A composite wire for producing a wear resistant and corrosion resistant coating on a substrate by thermal spraying, spray and fuse, or welding techniques are disclosed. The physical properties of the coating are particularly suited for high-temperature erosion-corrosion environments. The resultant coating exhibits good hardness, toughness, and bonding characteristics. The composite wire comprises a metallic outer sheath and an inner core containing boron carbide and chrome carbide.

19 Claims, 2 Drawing Sheets

COMPOSITE WIRES FOR COATING SUBSTRATES AND METHODS OF USE

This application claims priority to U.S. Provisional Application No. 60/476,875, filed on Jun. 6, 2003.

STATEMENT REGARDING FEDERALLY SPONSORED RESEARCH OR DEVELOPMENT

Not Applicable

FIELD OF THE INVENTION

The present invention relates to coatings for substrates, particularly metallic substrates. More specifically, the invention relates to composite wires or cored wires for forming wear-resistant and corrosion-resistant coatings on metallic substrates by thermal spraying processes, spray and fuse processes, or by welding techniques. The invention also relates to methods of employing the composite or cored wires to apply wear-resistant and corrosion-resistant coatings to substrates.

BACKGROUND OF THE INVENTION

Thermal spraying, i.e. the generic name for a class of processes that allow the depositing molten or semi-molten materials onto a substrate to form a wear or corrosion resistant coating, has been known in various forms for many years. Thermal spraying processes include plasma, flame, arc-plasma, arc and combustion spraying. Arc spraying is a form of thermal spraying which involves feeding two electrically conductive wires towards one another so that an arc is struck between the tips of the wires to melt the wire tips. The molten material is then atomized and sprayed onto a substrate by compressed gas.

This form of thermal spraying is widely used to provide corrosion-resistant coatings on various metallic articles. For example, U.S. Pat. No. 6,156,443 (Dallaire, et al.) discloses coatings that are formed by arc spraying cored wires onto metallic articles exposed to erodent particles. The cored wires are composed of a sheath of ductile metal, such as iron, low carbon steel, or ductile stainless steel, and a core comprising coarse ferroboron particles. The resulting coatings are designed to include iron boride phases having mean sizes equal to or larger than the sizes of the erodent particles.

Another thermal spraying process is described in U.S. Pat. No. 5,837,326 (Dallaire, et al.), which discloses a process for producing composite coatings comprising fine titanium diboride particles or crystals distributed throughout a stainless steel matrix by arc spraying cored wires onto a metallic substrate. The cored wires typically comprise a stainless steel outer sheath and an inner core of compacted powders including titanium diboride and a metal or metal alloy. The particles or crystals in these coatings impart hardness to the soft stainless steel matrix and enhances the resistance of the coatings to hard abrasive media.

The metal components of the cored wires used to form the coatings disclosed in both U.S. Pat. Nos. 6,156,443 (Dallaire, et al.) and 5,837,326 (Dallaire, et al.) are not highly alloyed, and consequently the coatings tend to be susceptible to corrosion attack in certain high temperature corrosive conditions, such as in boiler applications.

Generally, the binder metal (i.e., the metal of the outer sheath) in a wear-resistant coating is critical to the performance of the coating in corrosive conditions such as those encountered in boilers. For example, coatings with iron-based binder alloys, such as Armacor M™, exhibit extensive binder-material corrosion in boiler conditions, resulting in accelerated wear of the coatings. The consequent weakening of the bonds can also lead to premature coating failure due to complete spalling of the protective layer. Furthermore, the magnetic characteristics of these coatings prevent thickness measurements using standard equipment, such as Elcometers.

U.S. Pat. No. 4,741,974 (Longo, et al.) discloses a composite wire for forming wear resistant coatings wherein the wire is formed of an alloy sheath having iron, nickel, or cobalt as a major component. The core of the composite wire is formed of powder that includes boron or boron carbide. Due to its extreme hardness, boron carbide is employed in coatings where wear or abrasion is of primary concern. However, as with other conventional composite wires, in high-temperature corrosive environments, the wear resistant coatings may experience accelerated wear.

SUMMARY OF THE INVENTION

Accordingly, a composite wire is provided for producing a wear resistant and corrosion resistant coating on a substrate by thermal spraying, spray and fuse, or welding techniques. While the coating produced by the composite wire of the present invention is suitable for all temperature ranges, the physical properties of the coating are particularly well suited for high-temperature erosion-corrosion environments. The resultant coating exhibits good hardness, toughness, and bonding characteristics. The composite wire generally comprises a metallic outer sheath and an inner core containing boron carbide (BC) and chrome carbide (CrC). The metallic outer sheath may be formed of an essentially pure metal or an alloy. As stated above, the binder is generally considered to be critical to the performance of a coating and the binder selection will depend upon several factors including the environment to which the coated substrate will be exposed. The composite wire of the present invention is manufactured by conventional techniques wherein the specially formulated powder core is encapsulated by the outer sheath. The terms "composite wire" and "cored wire" are used synonymously herein to describe such a wire.

The chrome carbide/boron carbide formulation of the inner core provides a substantial improvement to conventional coatings deposited by conventional composite wires. The combination of chrome carbide and boron carbide gives added wear resistance, increases metal binder hardness, improves bonding of the coating to the substrate, and inhibits oxide formation.

The outer sheath may be constructed of any metal or alloy. Suitable binder material includes, but is not limited to, iron, carbon and low alloy steels, stainless steels, nickel, nickel alloys, such as nickel-copper, nickel-chromium, nickel-chrome-iron, and nickel-molybdenum alloys, copper, brasses, bronzes, aluminum bronzes, aluminum, aluminum alloys (1xxx-7xxx), titanium, titanium alloys, cobalt alloys, molybdenum and molybdenum alloys, tantalum and tantalum alloys. The combination of these binders with the inner core powder of the present invention results in coatings having superior physical properties over conventional coatings.

In addition to the composite wires discussed above, a method of forming a wear resistant and corrosion resistant coating on a substrate is also provided. The method generally includes the steps of providing a composite wire having and outer sheath formed from a metal or alloy, and an inner core comprising boron carbide and chrome carbide; and coating a substrate by employing the composite wire in conjunction with thermal spraying, spray and fuse, or welding techniques.

PREFERRED EMBODIMENTS OF THE INVENTION

Figure 1:
FIG. 1 is an electron micrograph of a cross section of an alloy 625 arc sprayed coating.

In the following detailed description of the preferred embodiments, it is to be understood that other embodiments may be utilized and structural changes may be made without departing from the scope of the present invention.

The coatings according to the present invention are specifically designed for articles subjected to wear and/or corrosion. Such articles include, for example, boiler tubes, hydraulic piston rods, pump casings, rollers in the paper and steel industry, wear plates, journals and shafts, and turbine blades and casings.

In one application, the coatings are designed to protect boiler tubes against erosion-corrosion related wastage and are applied to the boiler tubes by means of a conventional arc spraying apparatus. However, it will be appreciated from the description below that the coatings could also be applied to the boiler tubes by other thermal spraying apparatus employing wires as the feed material, using fusing equipment, or by suitable welding techniques. Arc spraying methods and apparatus are well documented in the art, see for example, U.S. Pat. Nos. 6,156,443 (Dallaire, et al.); 5,837,326 (Dallaire, et al.); European Patent No. EP 0 522 438 (Zurecki et al.); and PCT Patent No. WO 98/00574 (Seitz), the disclosures of which are incorporated by reference.

The coatings of the present invention are formed from composite wires, which are fed through a conventional arc spraying apparatus, such as the apparatus disclosed in PCT Patent No. WO 01/08810 (Seitz), the disclosure of which is incorporated herein by reference.

The composite wires of the present invention comprise an outer sheath formed from a metal or alloy. In one embodiment of the invention, which is particularly suited for the high temperature erosion-corrosion environment found in boiler applications, the cored wires comprise an outer tubular sheath formed from a chromium bearing, nickel base alloy such as an alloy 625, and an inner core, which comprises boron carbide and chrome carbide.

The preferred inner core formulation preferably comprises chrome carbide in an amount between about 25% and about 400% by weight of the amount of boron carbide. In other words, the ratio of chrome carbide to boron carbide preferably ranges between about 1:4 to about 4:1. More preferably, the inner core comprises chrome carbide in an amount between about 67% and about 230% by weight of the amount of boron carbide. In other words, the ratio of chrome carbide to boron carbide preferably ranges between about 1:1.5 to about 2.3:1. In one preferred embodiment, the inner core comprises about 100% by weight of chrome carbide relative to the amount of boron carbide, in other words the amounts of chrome carbide and boron carbide are substantially equivalent.

The chrome carbide in the inner core increases the wear resistance of the deposited coating or weld overlay. The chrome carbide is retained during the thermal spraying or welding, and is present in molten form within the coating structure during application. However, this benefit accrues on a sliding scale—the more chrome carbide used the better the result, but at the expense of displacing boron carbide and its beneficial effects. Conversely, most of the boron carbide does not appear to survive as a carbide during application of the coating. The boron carbide breaks up in the arc as uncontaminated boron and carbon, which both have substantial hardening effects. The hardening effect increases the hardness of the metal of the outer sheath through alloying and/or diffusion processes. Some of the larger particles of boron carbide may survive the arc. Those particles add to the wear resistance, much like the chrome carbide, but the resistance achieved with large particles of boron carbide is not as effective as that achieved with chrome carbide. Furthermore, the boron carbide inhibits the formation of oxides in the molten outer sheath during spraying. To achieve this result, a sufficient amount of boron carbide should be present in the inner core. Preferably, at least about 35% by weight of the inner core should consist of boron carbide to achieve very low oxide formation. However, this benefit accrues on a sliding scale—the more boron carbide used the better the result, but at the expense of displacing chrome carbide and its beneficial effects.

In addition to preventing oxide formation, the boron carbide also lowers the melting temperature of the binder material (except for aluminum, which already has a low melting point) and improves the solidification properties of the metal matrix making up the deposited coating. This gives fusing and self-fluxing properties to the coating. Furthermore, there is an increase in the temperature range of the solid-liquid phase (i.e., during melting or freezing). The increased range improves the spray characteristics and also improves the fusing characteristics.

In addition to the qualities described above, the coatings of the present invention are also easier to install and maintain. The boron additions in the metal binder matrix and the chrome carbide hard-phase morphology make repairs to the coatings relatively easy. Added to this, the high bond strength and the low coating residual stresses allow existing coatings to be grit blasted without disbonding the surrounding material.

While the inner core formulation of the present invention centers around chrome carbide and boron carbide, the inner core may also contain additional materials. The additional materials may include: carbides, such as tungsten carbide, titanium carbide, vanadium carbide, and the like; oxides, such as aluminum oxide, chrome oxide, zirconium oxide, and the like; and borides, such as chrome boride, nickel boride, iron boride, and the like. The inner core may also include additional metal powders, such as aluminum, nickel, chrome, or alloy powder, or composite powders, such as tungsten carbide nickel and chrome carbide nickel chrome powders.

The grain size of the chromium carbide and boron carbide will have an effect on the physical properties of the applied coating. Generally, the finer the grains of the carbides, the more homogenous the coating will be and generally the better the wear and corrosion properties. However, the cost and manufacturing constraints will limit the lower end of the grain size range. U.S. Pat. No. 4,741,974 (Longo, et al.), the disclosure of which is hereby incorporated by reference, discloses the effect of grain size with respect to boron carbide.

EXAMPLES

Example 1

A composite wire of the present invention was formed with an outer sheath comprising of INCONEL® alloy 625 and an inner core comprising a substantially equivalent mixture of chrome carbide and boron carbide. INCONEL® alloy 625 is a product of the Special Metals Corporation and contains 0.1% C, 0.5% Mn, 5.0% Fe, 0.02% P, 0.015% S, 0.5% Si, 0.5% Cu, 58% min Ni, 0.4% Al, 0.4% Ti, 20.0%-23.0% Cr, 3.15%-4.15% Nb+Ta, 8.0% 10.0% Mo. This composite wire provided coatings with good toughness characteristics, low oxides, and good wear characteristics due to the novel carbide formulation of the inner core. In addition, there was an increase in the hardness of the metal binder due to the boron content. The coatings also exhibited good bonding characteristics. The following table illustrates the improved wear resistance of a coatings deposited by a composite wire of the present invention (row 3 and row 4) compared to the wear resistance of other coatings:

| ASTM G65 Wear Test (15 minutes): | |
|---|---|
| Coating | Weight Loss (grams lost/6000 wheel revolutions) |
| 1) Fe Cr B (Arc) | 0.429 |
| 2) Fe Cr Mo W Mn B (HVOF) | 0.319 |
| 3) CrC/BC - Alloy 625 (Arc) | 0.285 |
| 4) CrC/BC - Fe Cr (Arc) | 0.212 |
| After Fusing | |
| 3) CrC/BC - Alloy 625 (Arc) | 0.184 |
| 4) CrC/BC - Fe Cr (Arc) | 0.165 |

Note that coatings of the present invention, as discussed above, have low oxide content and thus have superior fusing characteristics. The wear resistances of the CrC/BC-Alloy 625 coating and the CrC/BC-Fe Cr coating were substantially improved upon fusing.

In addition to the improvement to wear resistance, the overall strength of the metal binder was also substantially increased. The coating deposited with the CrC/BC-Alloy 625 composite wire exhibited an average hardness measurement of 803.2 100 g/Vickers/10 seconds. Whereas, coatings of pure alloy 625 are typically on the order of 280-350 100 g/Vickers/10 seconds.

Example 2

To illustrate bond strength, clean, bright smooth stainless steel coupons were coated, without any surface roughness, to establish how thick a coating could be sprayed before spalling occurred (i.e., bond failure). The first coupon was arc sprayed with pure alloy 625 and the second coupon was sprayed with a composite wire comprising an alloy 625 outer sheath and an inner core comprising 40% by weight boron carbide and 60% by weight chromium carbide. The first coupon exhibited delamination at 300 μm, whereas the coating applied in accordance with the present invention was sprayed up to 2000 μm without any appearance of spalling.

Example 3

Two clean steel coupons were coated, with grit-blasted surfaces; the first with pure alloy 625 and the second with a composite wire comprising an alloy 625 outer sheath and an inner core comprising 40% by weight boron carbide and 60% by weight chromium carbide. The coupons were mechanically damaged by cracking off the coating with a hammer and chisel. The pure 625 coating was peeled off of the first coupon as a continuous layer, while the composite wire sprayed coating could not be disjoined from the coupon. Rather, the composite wire sprayed coupon only sustained damage to the impact site, thus illustrating the high bond strength.

As stated above, in addition to good toughness, wear resistance, increased metal binder hardness, and improved bonding of the coating to the substrate, the inner core formulation of the present invention also inhibits oxide formation. This characteristic of the boron carbide/chrome carbide formulation is illustrated in FIGS. 1 and 2.

Figure 2:
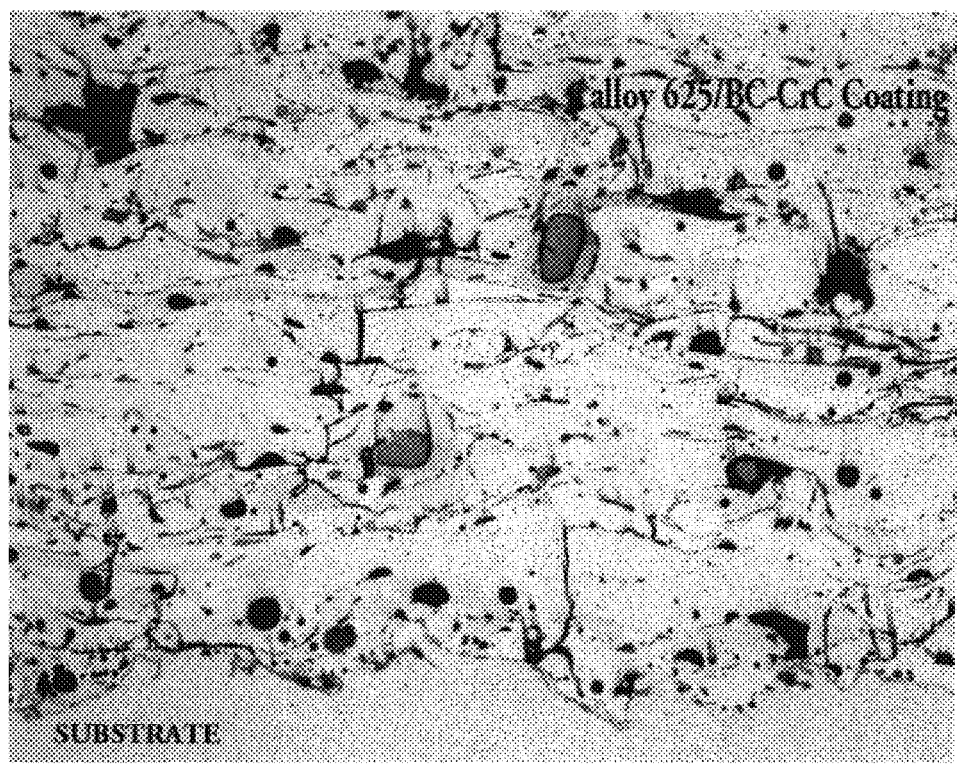
FIG. 2 is an electron micrograph of a cross section of an alloy 625/BC-CrC arc sprayed coating.

FIG. 1 shows a cross-sectional electron micrograph of a coating sprayed with pure alloy 625. The coating exhibits high oxide content, which shows up in the micrograph as grey bands. Due to the high oxide content, the alloy 625 coating will not fuse or melt as alloy 625 would fuse or melt if it were oxide free. Conversely, as can be seen in FIG. 2, the coating sprayed with an alloy 625/boron carbide-chrome carbide composite wire exhibits far less oxide content and can be easily remelted and fused.

While alloy 625 is a preferred alloy for the outer sheath in certain high temperature erosion-corrosion applications, alternative metals and alloys can also be employed. For example, alternative chrome bearing nickel base alloys include alloy C-276, alloy 686, or alloy 690. INCONEL® C-276, alloy 686, and alloy 690, which are all produced by the Special Metals Corporation contains: 0.02% C, 1.0% Mn, 4.0%-7.0% Fe, 0.04% P, 0.03% S, 0.08% Si, 0.5% Cu, bal. Ni, 2.5% Co, 14.5%-16.5% Cr, 15.0%-17.0% Mo, 3.0%-4.5% W (INCONEL® C-276); 0.01% C, 1.0% Mn, 5.0% Fe, 0.02% P, 0.02% S, 0.08% Si, 0.5% Cu, bal. Ni, 0.5% Al, 0.25% Ti, 19.0%23.0% Cr, 15.0%-17.0% Mo, 3.0%-4.4% W. (INCONEL® alloy 686); and 0.02% C, 1.0% Mn, 7.0%-11.0% Fe, 0.015% S, 0.5% Si, 0.5% Cu, bal. Ni, 27%-31% Cr (INCONEL® alloy 690). Nickel copper alloys, such as alloy 400, alloy R-405, and the like, and nickel molybdenum alloys such as, alloy B, alloy B-2, and the like, may also be employed depending on the required physical properties of the resulting coating and the environment to which the coating will be exposed.

As stated above, the metal binder material is not limited to nickel base alloys, rather the outer sheath may be constructed of any metal or alloy. Additional suitable binder material includes, but is not limited to, iron, carbon and low alloy steels, stainless steels, nickel, copper, copper alloys (e.g., brasses, bronzes, and aluminum bronzes), aluminum, aluminum alloys (e.g., aluminum-copper, aluminum-manganese, aluminum-manganese-magnesium, aluminum-silicon, aluminum-manganese-magnesium-chrome, aluminum-magnesium-silicon, and aluminum-zinc-manganese-magnesium-copper), titanium, titanium alloys (e.g., titanium alloyed with palladium, molybdenum, nickel, aluminum, vanadium, niobium, tantalum, tin, zirconium, chromium and iron), cobalt, cobalt alloys (e.g., cobalt alloyed with chromium, nickel, molybdenum, and tungsten), zirconium, zirconium alloys, tantalum and tantalum alloys. The combination of any of these binders with the inner core powder of the present invention results in coatings having superior physical properties over conventional coatings.

The cored wires may be formed in a conventional manner by placing the mix of carbides, which need not be an agglomerated mix, onto an alloy 625 strip, or a strip of some other outer sheath alloy, which is drawn continuously through a plurality of wire drawing dies to form an outer wire sheath around an inner carbide core. The final outer diameter of the cored wire will depend upon the application for which it is used. For most applications, the cored wire final diameter ranges between about 0.8 mm to about 6.4 mm. Conventional cored wire manufacturing techniques are disclosed in U.S. Pat. application Nos. 6,156,443 (Dallaire et al.) and 6,513,728 (Hughes et al.), of which both disclosures are hereby incorporated by reference.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A composite wire for producing a wear resistant and corrosion resistant coating on a substrate, said composite wire consisting of a tubular metallic outer sheath encapsulating a powdered inner core, said inner core comprising a mixture of boron carbide of at least 35% by weight, and chrome carbide in an amount between about 67% and about 185% by weight of the amount of boron carbide.

2. The composite wire of claim 1, wherein the outer sheath is formed of an essentially pure metal.

3. The composite wire of claim 1, wherein the outer sheath is formed of an alloy comprising a base metal.

4. The composite wire of claim 3, wherein the base metal of the alloy is selected from the group consisting of iron, nickel, aluminum, molybdenum, tantalum, copper, and titanium.

5. The composite wire of claim 3, wherein the alloy is a nickel base alloy.

6. The composite wire of claim 5, wherein the nickel base alloy comprises chromium.

7. The composite wire of claim 6, wherein the nickel base alloy comprises at least about 40% by weight of nickel.

8. The composite wire of claim 7, wherein the nickel base alloy further comprises molybdenum.

9. The composite wire of claim 8, wherein the nickel base alloy is an alloy 625.

10. The composite wire of claim 1, wherein the inner core comprises substantially equivalent amounts of chrome carbide and boron carbide.

11. The composite wire of claim 1, wherein the inner core further comprises another carbide in addition to boron carbide and chrome carbide.

12. The composite wire of claim 1, wherein the inner core further comprises at least one carbide selected from the group consisting of tungsten carbide, vanadium carbide and titanium carbide.

13. The composite wire of claim 1, wherein the inner core further comprises a metal powder.

14. The composite wire of claim 1, wherein the inner core further comprises a composite powder.

15. The composite wire of claim 14, wherein the inner core further comprises tungsten carbide nickel powder.

16. The composite wire of claim 1, wherein the inner core further comprises a boride.

17. The composite wire of claim 16, wherein the inner core further comprises at least one boride selected from the group consisting of chrome boride, nickel boride, and iron boride.

18. The composite wire of claim 1, wherein the inner core further comprises an oxide.

19. The composite wire of claim 18, wherein the inner core further comprises at least one oxide selected from the group consisting of aluminum oxide, chrome oxide, and zirconium oxide.

* * * * *